US007100804B2

(12) United States Patent
Heiberger

(10) Patent No.: US 7,100,804 B2
(45) Date of Patent: Sep. 5, 2006

(54) DISPENSER WITH A METERING DEVICE

(75) Inventor: Franz Heiberger, Stettfurt (CH)

(73) Assignee: Hilti Aktiengesellschaft, Schaan (LI)

( * ) Notice: Subject to any disclaimer, the term of this patent is extended or adjusted under 35 U.S.C. 154(b) by 189 days.

(21) Appl. No.: 10/939,054

(22) Filed: Sep. 10, 2004

(65) Prior Publication Data

US 2005/0072811 A1 Apr. 7, 2005

(30) Foreign Application Priority Data

Sep. 18, 2003 (DE) ................................ 103 43 575

(51) Int. Cl.
*G01F 11/06* (2006.01)

(52) U.S. Cl. ....................... 222/310; 222/326; 222/389

(58) Field of Classification Search .................. 222/61, 222/137, 145.5, 309, 310, 326, 327, 389
See application file for complete search history.

(56) References Cited

U.S. PATENT DOCUMENTS 4,826,050 A * 5/1989 Murphy et al. ............. 222/175
5,181,636 A * 1/1993 Anderson et al. ........... 222/389
5,184,758 A * 2/1993 Keller ......................... 222/137
5,514,135 A * 5/1996 Earle ........................... 606/93
5,671,873 A * 9/1997 Hammerl et al. ........... 222/309
2004/0173638 A1* 9/2004 Stern .......................... 222/309

* cited by examiner

*Primary Examiner*—Joseph A. Kaufman
(74) *Attorney, Agent, or Firm*—Abelman, Frayne & Schwab

(57) ABSTRACT

A pressure medium-operated dispenser for dispensing a mass from a storage and dispensing container and including a housing, a dispensing device (13) supported in the housing (12) and having a pressure medium-operated plunger (15) with at least one push member (16), and a metering device (14) for presetting an amount of mass to-be-dispensed by the dispensing device and including adjustment element (26) for setting the metered amount, a carrier member (27) cooperating with the dispensing device (13), a return element (28) for displacing the carrier member (27) from its end position to its initial position, a retaining member (29) supported in the housing (12) without possibility of displacement in the longitudinal direction (L) of the dispenser (11), and a follow-up member (30) displaceable in the longitudinal direction (L) of the dispenser (11) and extending in a guide tube, the carrier member (27) being arranged at the free end of the follow-up member (30) and secured in the guide tube for connection the follow-up member (30) to the guide tube connected with the plunger (15).

17 Claims, 8 Drawing Sheets

DISPENSER WITH A METERING DEVICE

BACKGROUND OF THE INVENTION

1. Field of the Invention

The present invention relates to a pressure medium-operated dispenser and, in particular to a pneumatically operated dispenser for dispensing a mass from a storage and dispensing container and which includes a housing, a dispensing device supported in the housing for displacement in a longitudinal direction of the dispenser and having a pressure medium-operated plunger, and at least one push member connected with the plunger and extending therefrom in a dispensing direction with the dispenser having a compression chamber for containing pressure medium for displacing the plunger, the dispenser further including a metering device for presetting an amount of mass to-be-dispensed by the dispensing device and including adjustment means for setting the metered amount, a carrier member cooperating with the dispensing device, and a return element for displacing the carrier member from its end position to its initial position.

2. Description of the Prior Art

Dispensers of the type described above are used for dispensing a metered amount of a mass, e.g., from a cartridge or a tubular bag, and are driven with compressed air or a hydraulic fluid. The dispensable mass has one or several components stored in one or several cartridges. The dispenser has, as discussed above, a housing and dispensing and metering devices. The dispenser is provided, e.g., with a receptacle or cradle for receiving one or more cartridges from which with the dispenser, the mass is brought out, in particular, is squeezed out. In the front region of the dispenser, there is usually provided a mixing element that mixes the dispensed mass components to a ready to-be-used mass. With a predetermined use, e.g., with chemical dowels, the metered mass amount is defined per one dowel. The metering device should insure a precise and timely delivery of the mass, e.g., in a borehole. For adjusting, in particular, for precise adjusting of the metered amount, the metering device is provided with adjustment means.

U.S. Pat. No. 5,020,693 discloses a dispenser having a housing, a dispensing device provided with an elongate pressing-out member, a metering device for preselecting a metered amount of the mass to be dispensed with the dispensing device, and an actuating unit for operating the dispenser. The metering device includes a return device, adjustment means for adjusting the metered amount, and a carrier or support member that cooperates with the elongate pressing-out member and that is returned from its end position to its initial position with the return device. The pressing-out member is supported on the housing for a longitudinal displacement and has several push members for squeezing a mass from a cartridge. The metering device has at least one stop displaceable in the longitudinal direction of the pressing-out member and which is securable to the housing with a locking screw.

The drawback of the dispenser, which is disclosed in U.S. Pat. No. 5,020,693, consist in that the return device or element at least somewhat displaces the screwed-to stop, which can change the preset metered amount. In addition, the adjustment of the metered amount with the adjustment means is unwieldy and not sufficiently precise.

Accordingly, an object of the present invention is to provide a pressure medium-operated dispenser that can be economically produced and which would insure a precise and convenient adjustment of the metered amount.

Another object of the present invention is to provide a dispenser in which an undesired change of the metered amount, in particular, during the operation of the return element is prevented.

SUMMARY OF THE INVENTION

These and other objects of the present invention, which will become apparent hereinafter, are achieved by providing in a metering device, a retaining member supported in the housing without possibility of displacement in the longitudinal direction of the dispenser, and a follow-up member displaceable in the longitudinal direction of the dispenser and extending in a guide tube which is connected with the plunger. The carrier member is arranged at a free end of the follow-up member and is secured in the guide tube for connecting the follow-up member with the guide tube.

With a dispenser according to the present invention, essentially, the displacement path, which is directly correlated with the dispensed amount, is measured. The path measurement is effected purely mechanically and is controlled only with a pressure medium. Electronic control and measurement are not necessary, so that no other sources of energy besides the pressure medium are necessary. Therefore, the inventive dispenser has a very high performance capability, while simultaneously insuring a precise and time-saving metering of the dispensed mass.

The retaining member of the metering device, which is arranged without a possibility of displacement in the longitudinal direction of the dispenser, is so secured to the closing cover of the dispenser that it can be rotated about an axis with the adjustment means. However, its position in the longitudinal direction of the dispenser does not change. The follow-up member, which is displaceable in the longitudinal direction of the dispenser, can, on one hand, be rotated about the axis with the adjustment member and, on the other hand, be displaced, when connected to the dispensing device, together therewith, in the longitudinal direction of the dispenser. The return element is stationary secured, on one hand, to the retaining member of the metering device or at least in the region of the retaining member and, on the other hand, to the carrier member displaceable in the longitudinal direction of the dispenser or at least in the region of the carrier member.

With the adjustment means, a distance is preset which the plunger and therewith the at least one push member should cover for dispensing the preset mass amount. The at least one push member is provided at its free end with a pressure plate that acts on the storage and dispensing container. The size of the path and the cross-sectional dimensions of the storage and dispensing container determine the amount of the dispensed mass. Upon actuation of an actuation knob, e.g., a trigger, which is arranged on the handle of the dispenser, a pressure medium is fed into the compression chamber. Simultaneously, the carrier member is fixed in the guide tube. The displaceable, in the dispenser longitudinal direction, follow-up member of the metering device will, with a further increase of pressure be displaced, together with the plunger, in the dispensing direction until the present distance is covered, and the carrier member reaches its end position during the dispensing step. Finally, the compression chamber is vented, and the fixed attachment between the guide tube and the carrier member is released. With the return element, the carrier member and the follow-up member are displaced from their respective and positions to their initial positions. The plunger does not move during the displacement of the metering elements to their initial positions, remaining in a position for further dispensing steps. The dispenser is ready to perform a following dispensing step. The adjustment of the adjustment means is only necessary only when the to-be-dispensed amount of the mass needs to be changed.

Advantageously, the guide tube is a component of the at least one push member. This permits to realize a compact construction of the dispenser with fewer separate elements.

Preferably, the carrier member is radially expandable with the pressure medium. The carrier member can be formed, e.g., as an elastic member such as, e.g., a solid rubber ball radially expandable under a load applied by the pressure medium, providing for attachment of the follow-up member of the metering device and the at least one push member. When the pressure applied by the pressure medium to the carrier member is released, the carrier member rivets to its initial form and can be displaced by the retaining element from its end position to its initial position.

Advantageously, the carrier member has a sleeve member with at least one radially extending opening and surrounded over its outer circumference with an elastic, stretchable cover. With a pneumatically driven dispenser, the carrier member is formed, e.g., as an inflatable bellows. Because the carrier member is arranged in the at least one push member and because the distance between the outer profile of the carrier member and the inner profile of the push member necessary to insure expansion of the carrier member can be small, small loads need to be applied to the cover by the pressure medium. The cover is formed, e.g., of rubber or plastics and is shrinked over the sleeve member. The sleeve member is formed, e.g., of metal and is sealingly closed at its end facing in the dispensing direction. Therefore, the pressure medium, which penetrates in the carrier member, can only flow through the at least one radial opening for expanding or radially stretching the cover. Thereby, the carrier member, which has preferably a tubular cross-section, secures the at least one push member. As soon as the pressure of the pressure medium is reduced, the pressure medium flows from the cover back through the at least one radial opening, whereby the outer diameter of the carrier member is reduced.

Advantageously, in order to provide a connection between the compression chamber in the housing and the carrier member, there is provided a connection channel extending through the follow-up member and, optionally, through the retaining member of the metering device. Through the connection channel, the pressure medium, when acting on the dispensing device, also flows from the compression chamber to the carrier member for securing it in the push member, and flows from the carrier member to the compression chamber, upon venting of the compression chamber. The plunger should be sealed against the housing to insure tightness.

Advantageously, the metering device includes a first control cam adjustable with adjustment means. The first control cam has a gradient, e.g., which corresponds to a maximal distance that the metering device should provide during a dispensing process. It is particular advantageous when the first control cam is continuous, which provides for an arbitrary adjustment of the metered amount over the predetermined region. Advantageously, the first control cam does not extend over the entire circumference. There can be provided a stop that would prevent the user from overrotating the adjustment member. The adjustment means of the metering device contain marking that facilitate the presetting of the desired, metered amount of the to-be-dispensed mass.

Advantageously, the follow-up member of the dispenser has a sleeve and tubular section fixedly connected with the sleeve, with the control cam being provided on the outer surface of the sleeve. The sleeve of the follow-up member can slide over the retaining member of the metering device. The sleeve has advantageously a circular cross-section on which the first control cam is formed. Advantageously, optionally, the sleeve can be provided with a stop for limiting the maximal displacement in the longitudinal direction of the dispenser. The stop, which is provided on the follow-up member sleeve can cooperate, e.g., with a further stop provided on the retaining member of the metering device. Thereby, a high performance capability or use function of the dispenser is insured even in case of malfunction or any over crossing of a maximal preset distance.

Advantageously, there are provided a relief valve arranged on the housing for venting the compression chamber, and a mechanism for actuating the relief value and operable by the metering device, in particular by the first control cam. The relief valve provides for immediate venting of the compression chamber of the dispenser, whereby the displacement of the dispensing device in the dispensing direction stops suddenly. The mechanism for actuating of the relief valve is formed, e.g., as a hingedly supported toggle lever that is actuated by the metering device. As soon as the predetermined distance of the dispensing device has been covered, the first control cam, which is provided on the sleeve of the follow-up member, engages an element at the end of the toggle lever, and the toggle lever opens the relief valve, whereby the pressure medium in the compression chamber escapes. When a hydraulic pressure medium is used, there is provided, for its recovery, a collector that adjoins the relief valve and is attached to the housing.

Advantageously, the return element of the metering device is formed as a helical spring, optionally, as a cylindrical helical spring. As a result of attachment of the helical spring to the axially stationary retaining member and the carrier member, the spring becomes stretched and tensioned during the dispensing process. After the pressure has been reduced and the resulting release of the attachment of the carrier member to the inner wall of the push member, the spring returns the carrier member and the follow-up member from the end position to the initial position.

Advantageously, a control valve is provided on the retaining member for controlling flow of the pressure medium between the compression chamber and the carrier member to thereby control the expansion of the carrier member. The control valve permits to close the connection conduit, blocking the flow of the pressure medium, so that the metering device is operated only from outside, enabling a free dispensing, e.g., a prolonged dispensing process. Advantageously, there is provided, optionally, a second control cam on the housing for controlling the control valve. The second control cam can be arranged, e.g., on the closing cover on which the adjustment means is also arranged. With the adjustment means, on one hand, the metering device can be adjusted to insure dispensing different amounts of the mass and, on the other hand, the duration of the operation of the dispenser can be adjusted.

Advantageously, on the housing or at least on the push member, there is provided a measurement device for indication of the distance covered by the at least one push member in the longitudinal direction of the dispenser. The measurement device includes marking and an indicator which shows the position of the dispensing device corresponding to the displacement of the dispensing device relative to the housing, and the amount of mass dispensed as a result. The marking is stamped on the outer side of the housing or pressed on. The indicator can be formed, e.g., as a bar connected with at least one push member and movable in accordance with the movement of the at least one push member.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
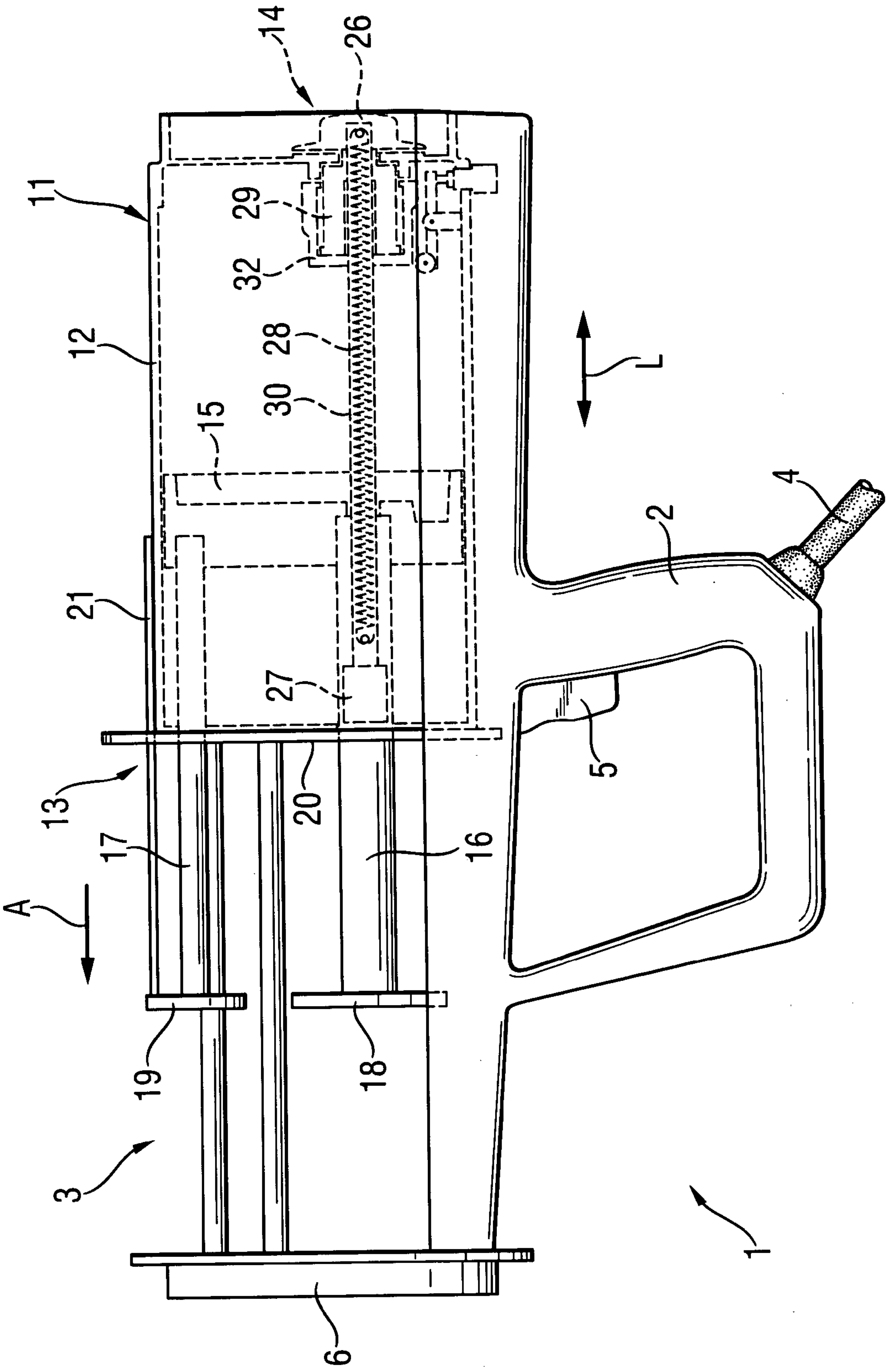
FIG. 1 a side view of a dispenser according to the present invention.
Figure 2:
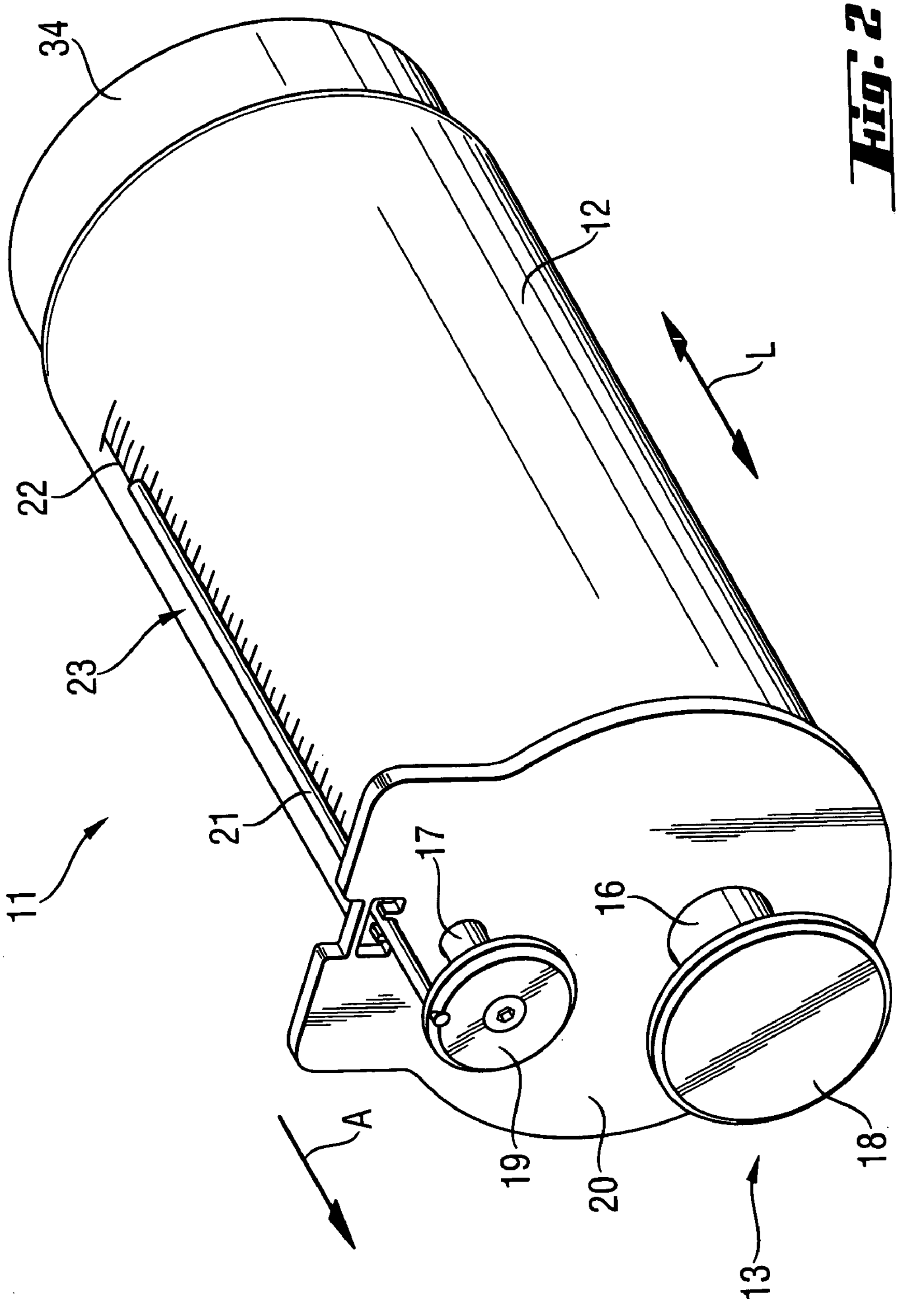
FIG. 2 a perspective view of a dispensing device for a dispenser according to the present invention.

A dispenser 11 according to the present invention, which is shown in FIGS. 1–6, is pneumatically driven. However, the dispenser according to the present invention can be driven with other pressure media.

The dispenser 11 is mounted on a hand-held tool 1 that in addition to the dispenser 11 according to the present invention, includes a handle 2 and a cradle 3 for a storage and dispensing container, e.g., a two-component cartridge. The cradle 3 is closed, at its side facing in a dispensing direction, with a closing plate 6 on which a mixing element for mixing the two components, which are contained in the cartridge, can be mounted. Separate components, which are brought out from the cartridge, as mixed by the mixing element to a use-ready mass.

Compressed air, which functions as a pressure medium, is fed to the dispenser 11 through a conduit 4 and the handle 2. An actuation member 5 for the dispenser 11 is actuated manually and is arranged in the conduit of the compressed air leading to the dispenser 11. Upon actuation of the actuation member 5, the compressed air is fed to the dispenser 11.

The dispenser 11 has a housing 12 in which there are arranged a dispensing device 13 and a metering device 14 that preselects the metered amount of the masses, which are contained in the cartridge, to-be-brought out with the dispensing device. The dispensing device 13 includes a plunger 15 on which there are arranged two, extending in a dispensing direction A, first and second push members 16, 17 for pressing out first and second components, respectively, of the cartridge. The first push member 16 is formed of a tubular section, which also serves as a guide tube for the dispensing device 13. The second push members 17 is formed of a round profile, e.g., of metal or plastics. On the free ends of the first and second push members 16, 17, there are arranged, respectively, pressure plates 18, 19. Even in the initial position of the dispenser 11, the first and second push members 16, 17 extend through the front plate 20 of the housing 12 of the dispenser 11.

On the pressure plate 19, there is arranged a carried member 21 that, together with a marker 22 provided on the housing 12 of the dispenser 11, form a measuring device 23 that shows the amount of the brought-out mass.

The metering device 14 includes adjustment means 26, which is formed as turning knob, for adjusting of a metered amount that should be brought out with the dispenser 11 during a dispensing process. The metering device 14 further includes a carrier member 27 which is formed as an inflatable bellows and which cooperates with the first push member 16, and a return element formed as a helical spring 28. The metering device 14 also includes an axially stationary retaining member 29 extending in a longitudinal direction L of the dispenser 11, and a follow-up member 30 displaceable in the longitudinal direction L of the dispenser 11. The adjustment means 26 rotates both the retaining member 29 and the follow-up member 30 about an axis 42. The carrier member 27 is arranged on a free, facing in the dispensing direction A, end of a tubular section 31 that, together with a sleeve 32 arranged on the tubular section 31, form the follow-up member 30 of the metering device 14. On the sleeve 32, there is formed a first control cam 35 the shape and function of which will be described further below. For protecting the adjustment means 26, there is provided a closing cover 33 having a collar 34 projecting beyond the housing 12.

The closing cover 33 has a receptacle 36 for partially receiving the retaining member 29 of the metering device 14. In the receptacle 36, there is provided a second control cam 37 for controlling a control valve 38. When the adjustment means 26 rotates the retaining member 29 of the metering device 14 in such a way that the control valve 38 is pressed into a connection section 39 of the retaining member 29 of the metering device 14, which in the embodiment of the orientation of the control valve 38 shown in the drawings, corresponds to the direction toward a location 40 (see FIG. 4), no compressed air flow to the carrier member 27 through the connection channel 41 formed by the tubular section 31, and the carrier member 27 cannot engage the first push member 16.

Figure 3A:
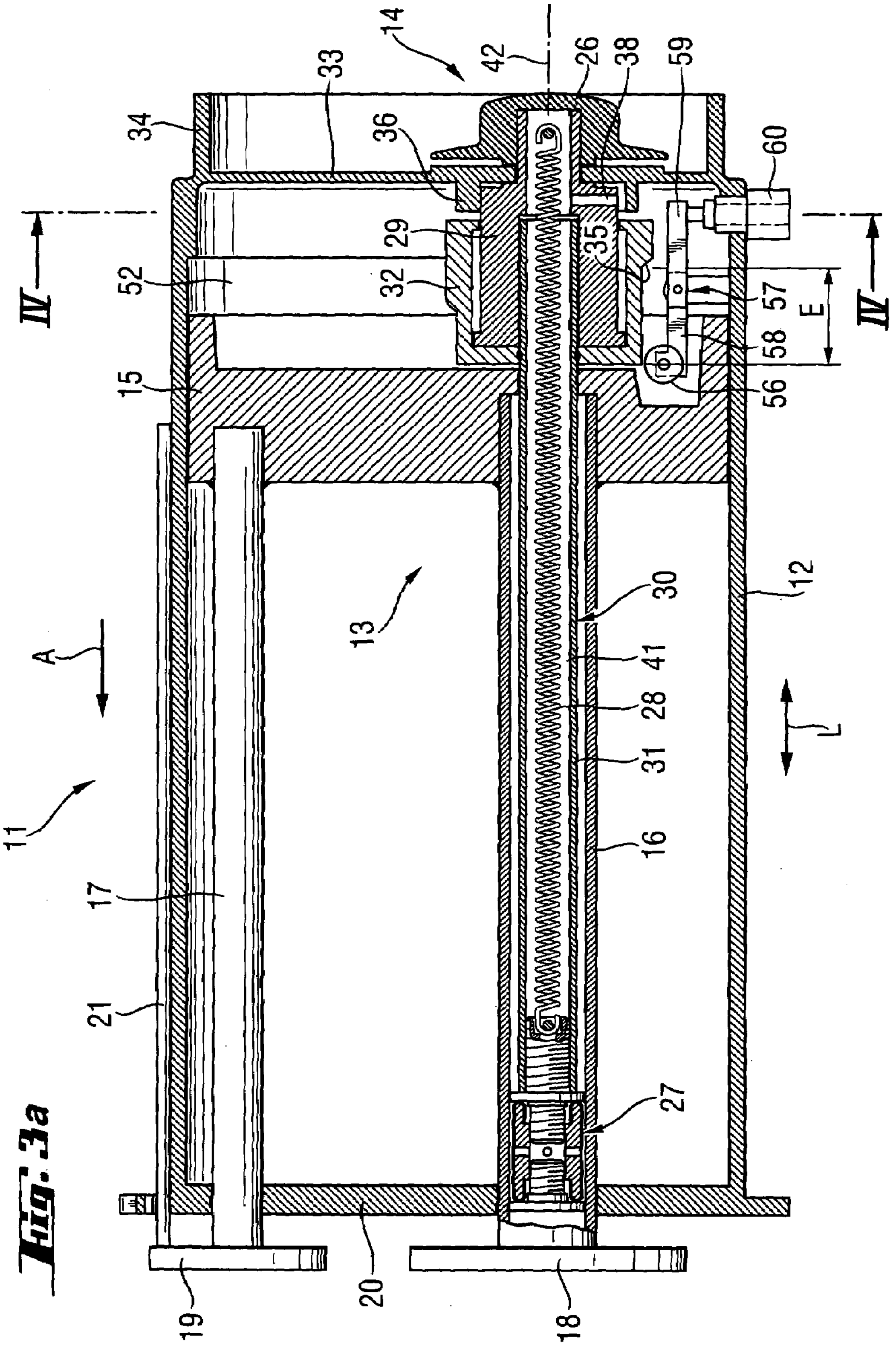
FIG. 3*a* a cross-sectional view illustrating the position of the dispenser according to the present invention in an initial stage of a dispensing process.
Figure 3B:
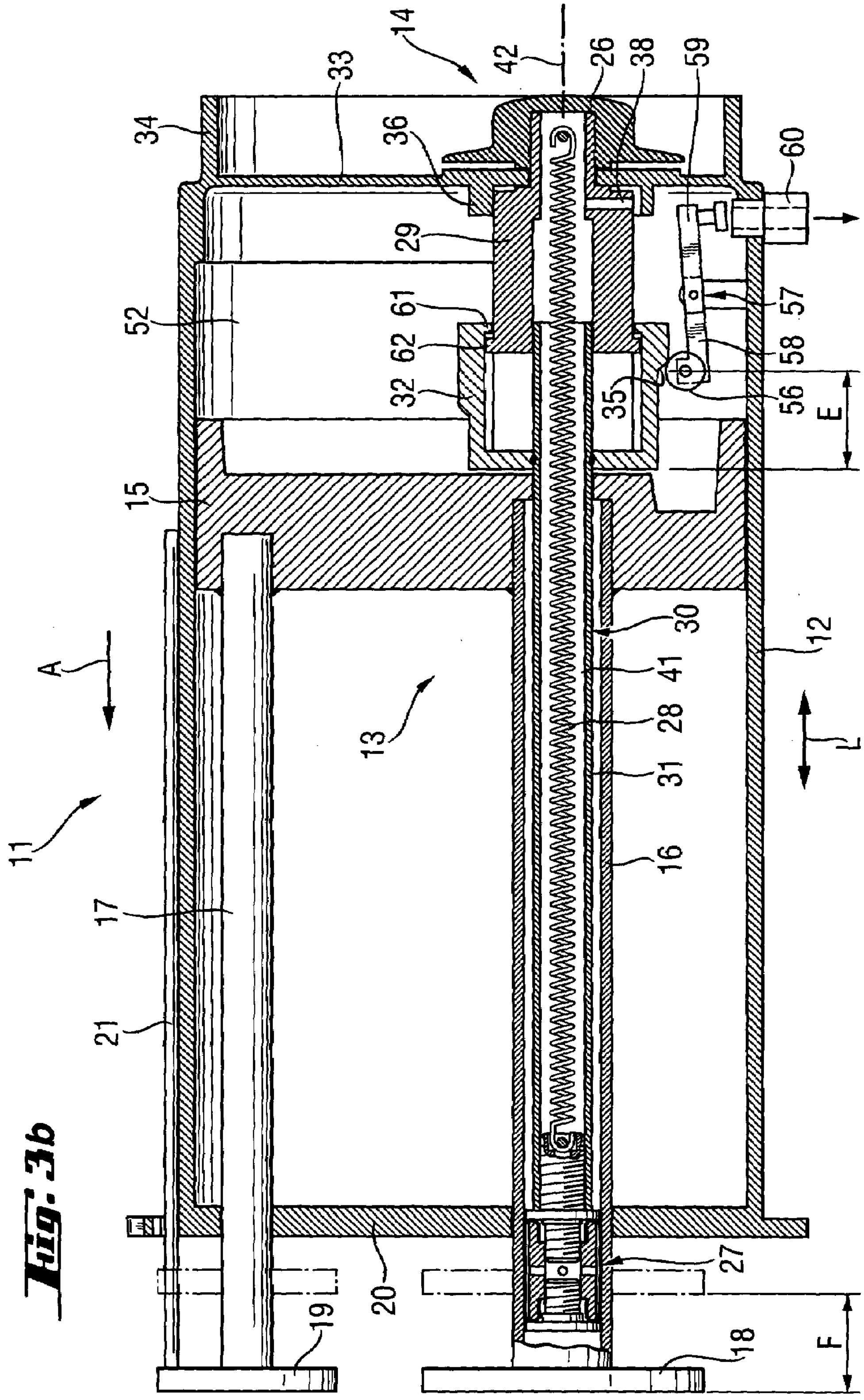
FIG. 3*b* a cross-sectional view illustrating the position of the dispenser according to the present invention in an end stage of the dispensing process.

Further below, with reference to FIGS. 3*a*–3*b*, the functions of separate elements of the dispenser 11 will be described in detail based on a dispensing process effected with the dispenser 11 in three different operational positions of the dispenser 11. FIG. 3*a*, as discussed above, shows the initial position of the dispenser 11. In the initial position of the dispenser 11, the push members 16 and 17 are displaced in a direction opposite the dispensing direction A as far as possible. In the initial position of the dispenser 11, a cartridge can be placed in a cradle 3 of the hand-held tool 1. By rotation of the adjustment means 26 in the direction of arrow 51, there is preset a length E which the follow-up member 30 of the metering device 14 should cover for dispensing a desired amount of the mass from the cartridge. Upon actuation of the actuation member 5, compressed air is fed into a compression chamber 52. The retaining member 29 is so oriented or aligned that the control valve 38 provides for flow of compressed air through the connection channel 41 to the carrier member 27. The carrier member 27, which is formed as an inflatable bellows, expands radially, and the follow-up member 30 of the metering device 14 becomes fixed in the first push member 16 already upon small pressure built-up in the compression chamber 52. Upon increase of the pressure in the compression chamber 52, the entire dispensing device 13 is displaced in the dispensing direction A. The follow-up member 30, because of its connection with the first push member 16, likewise moves in the dispensing direction A, and squeezes out the to-be-brought out mass. The compression spring 28 has, on one hand, one of its ends attached fixedly in the region of the adjustment means 26, e.g., to the retaining member 29 and, on the other hand, has its opposite end attached to the carrier member 27, e.g., in the region of the free end of the follow-up member 30 of the metering device 14. Thereby, during the dispensing process, the spring 28 becomes stretched and produces a biasing force acting in the direction opposite the dispensing direction A.

The engagement of the first control cam 35, which is provided on the sleeve 32, with the contact wheel 56 indicates that the dispensing device 13 and the follow-up member 30 of the metering device 14 have covered the predetermined distance E and that predetermined thereby, amount of the mass has been squeezed out of the cartridge. The length F, which defines the difference between the position of the push members 16, 17 in FIG. 3*b* and the position of the push members 16, 17 in FIG. 3*a*, corresponds to the distance E. The carrier member 27 occupies a so-called end position. When the control cam 35 engages the contact wheel 56 of the mechanism 57, the toggle levers 58, 59 open a relief valve 60 in the housing 12, releasing the compressed air from the compression chamber 52. The first metered dispensing process ends, and a desired or predetermined amount of the dispensable mass has been squeezed out of the cartridge. The sleeve 32 has a stop 61 that cooperates with a stop 62 on the retaining member 29. These stops, which function as safety elements, prevent, in case the compression chamber 52 failed to be vented because of some malfunction, the follow-up member 30 from sliding from the retaining member 29 because of the resulting continuous dispensing process, as further displacement of the follow-up member 30 makes the metering device 14 and the dispenser 11 inoperative.

Figure 3C:
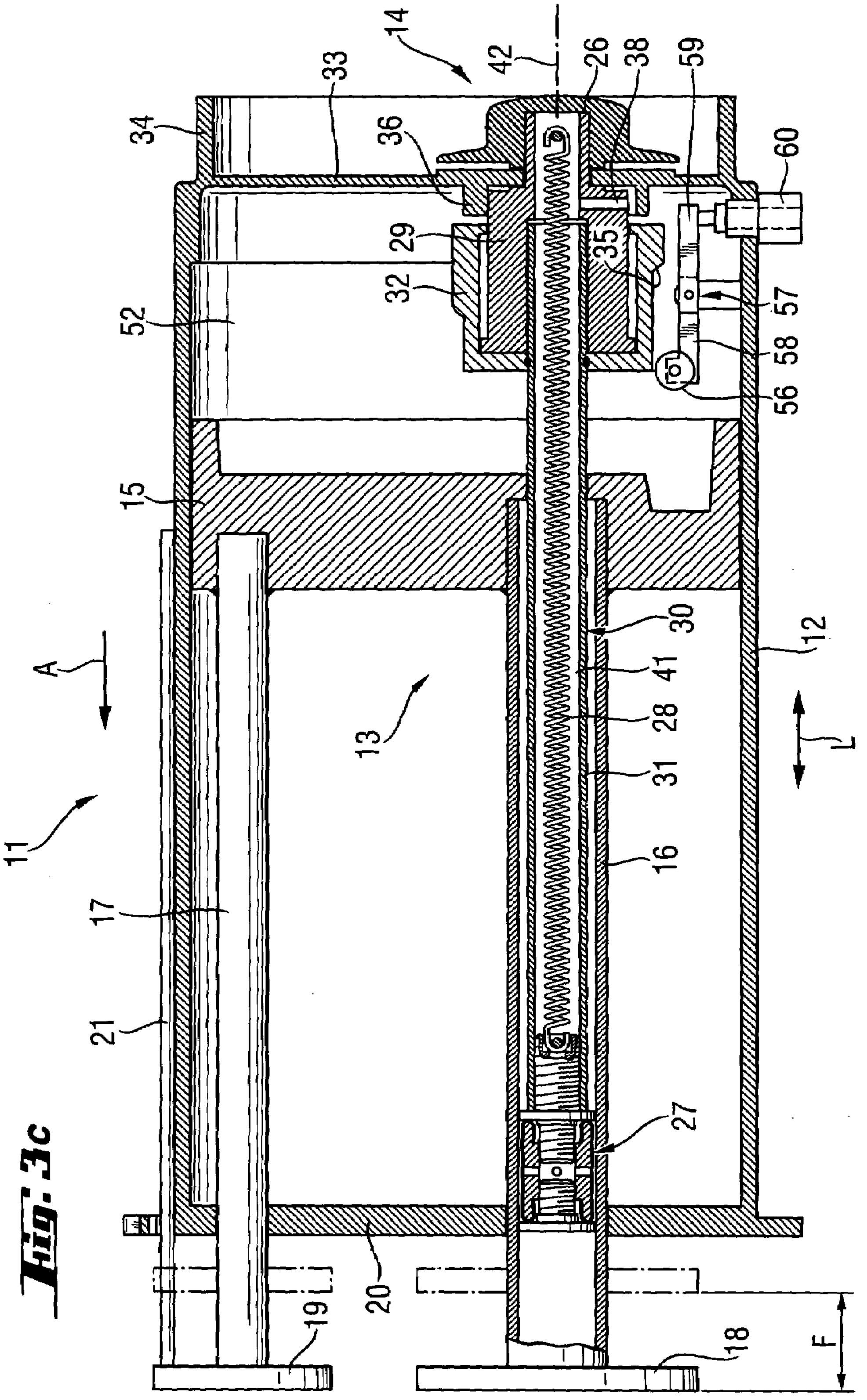
FIG. 3*c* a cross-sectional view illustrating the position of the dispenser according to the present invention in an intermediate stage of the dispensing process.
Figure 4:
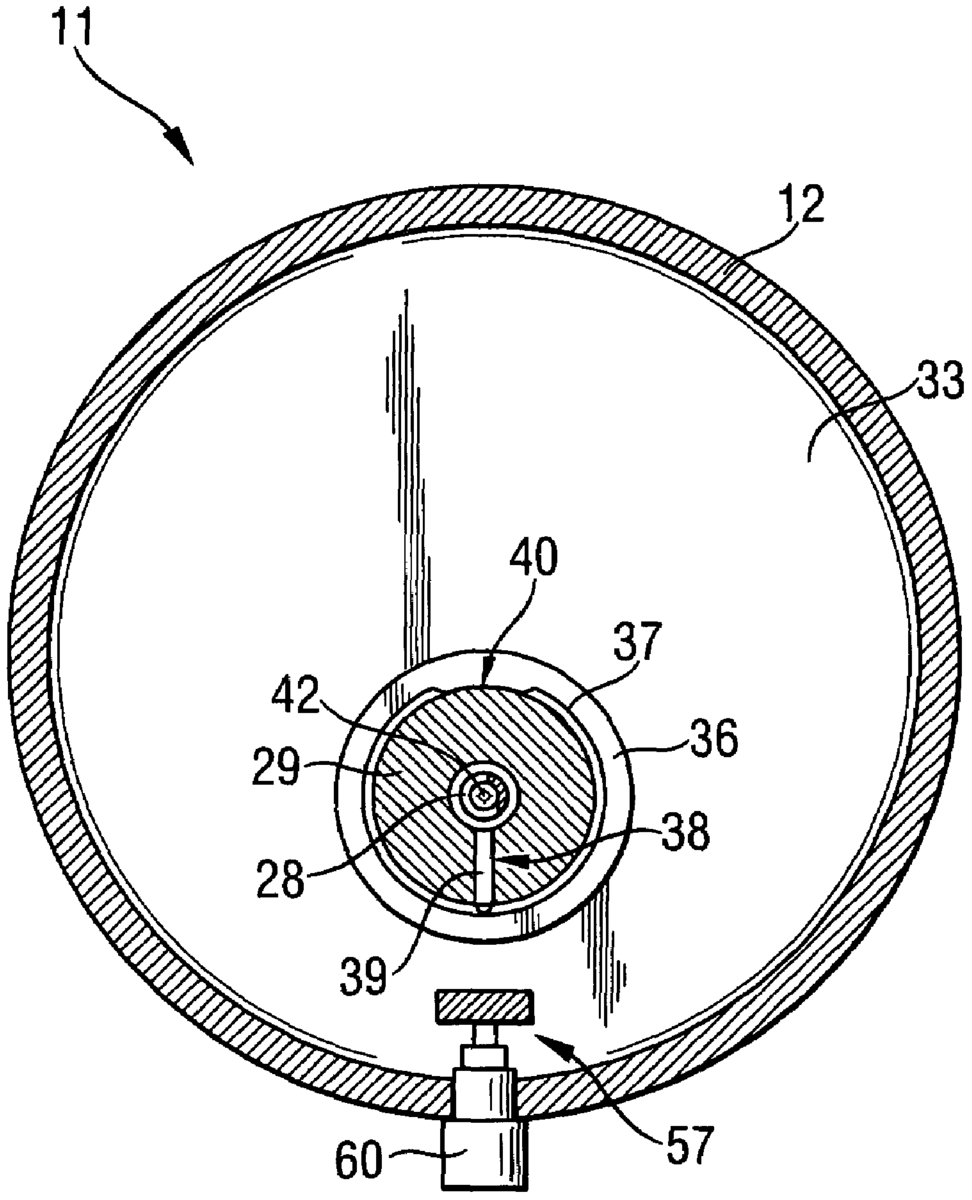
FIG. 4 a cross-sectional view along line IV—IV in FIG. 3*a* showing the closing cover of a dispenser according to the present invention.

As a result of the pressure fall in the compression chamber 52, the compressed air flows from the carrier member 27 through the connection channel 41 back into the compression chamber 52. As a result, the carrier member 27 assumes its original radial dimension, whereby the connection between the carrier member 27 and the first push member 16 is released. The biasing force, which was generated upon the extension of the helical spring 28, displaces the follow-up member 30 of the metering device 14 and the carrier member 27 to their initial positions. These positions are shown in FIG. 3*c*. The contact between the second control cam 35 and the contact wheel 56 of the mechanism 57 is interrupted, and the relief valve 60 becomes closed. The dispensing device 13 remains in its previously assumed position. The metering device 14 and the dispenser 11 find themselves in the initial position ready for a new actuation of the dispenser. Accordingly, without readjustment of the adjustment means 26, upon a new actuation of the dispenser 11, the same amount of the to-be-dispensed mass will be squeezed out of the cartridge. The dispensing process can be repeated until the cartridge becomes completely empty, or the plunger 15 abuts the front cover 20.

Figure 5B:
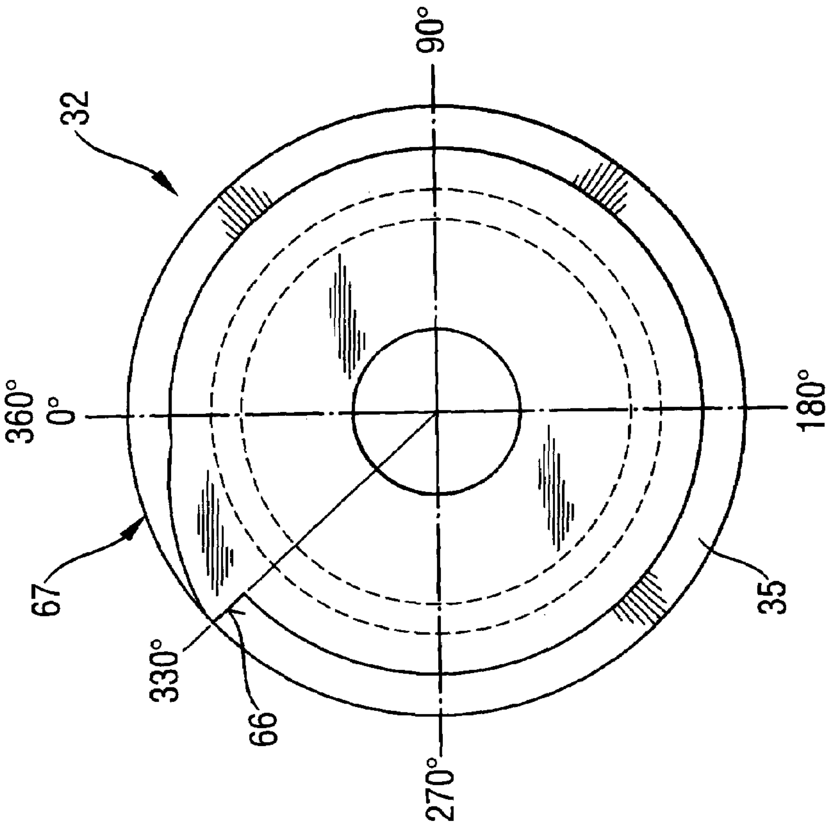
FIG. 5*b* a front view of the control cam sleeve for a dispenser according to the present invention.
Figure 5A:
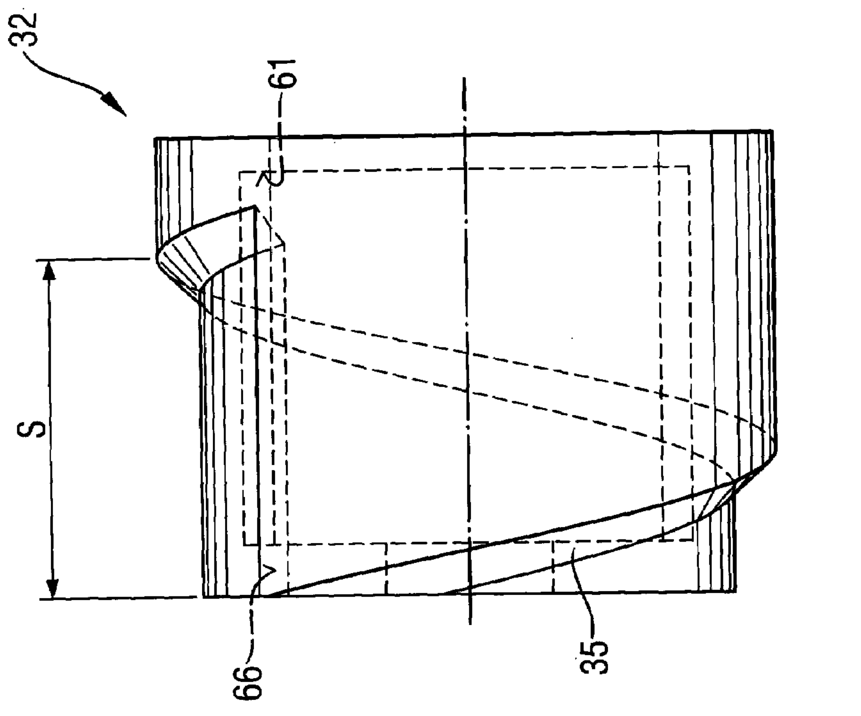
FIG. 5*a* a side view of a control cam sleeve for a dispenser according to the present invention.

FIGS. 5*a* and 5*b* show, as it has also been discussed above, side and front view of the first control cam 35 provided on the sleeve 32. The first control cam 35 has a substantially constant gradient, so that a maximal extension S of the first control cam 35 corresponds to the distance E that is preset with the metering device 14 for dispensing a predetermined amount of the to-be-dispensed mass. The first control cam 35 extends by 330° over the circumference of the sleeve 32, and it has a shoulder that forms the stop 66. A user can preset, upon actuating the adjustment means 26, a maximal distance to be covered by the movable follow-up member 30 from zero to the maximal extension S. The stop 66 prevents, on one hand, an undesirable overrotation of the adjustment means 26 and, on the other hand, indicates to the user that the sleeve 32 attained its radial end position. In addition, the metering device 14 can be adjusted with the adjustment means 26 for a continuous operation of the dispenser 11 which would provide for dispensing of the mass from the cartridge as long as the user actuates the actuation member 5 on the handle 2 or until the cartridge becomes completely empty. The duration of the operation corresponds to the region 67 of the circumference of the sleeve 32.

Figure 6:
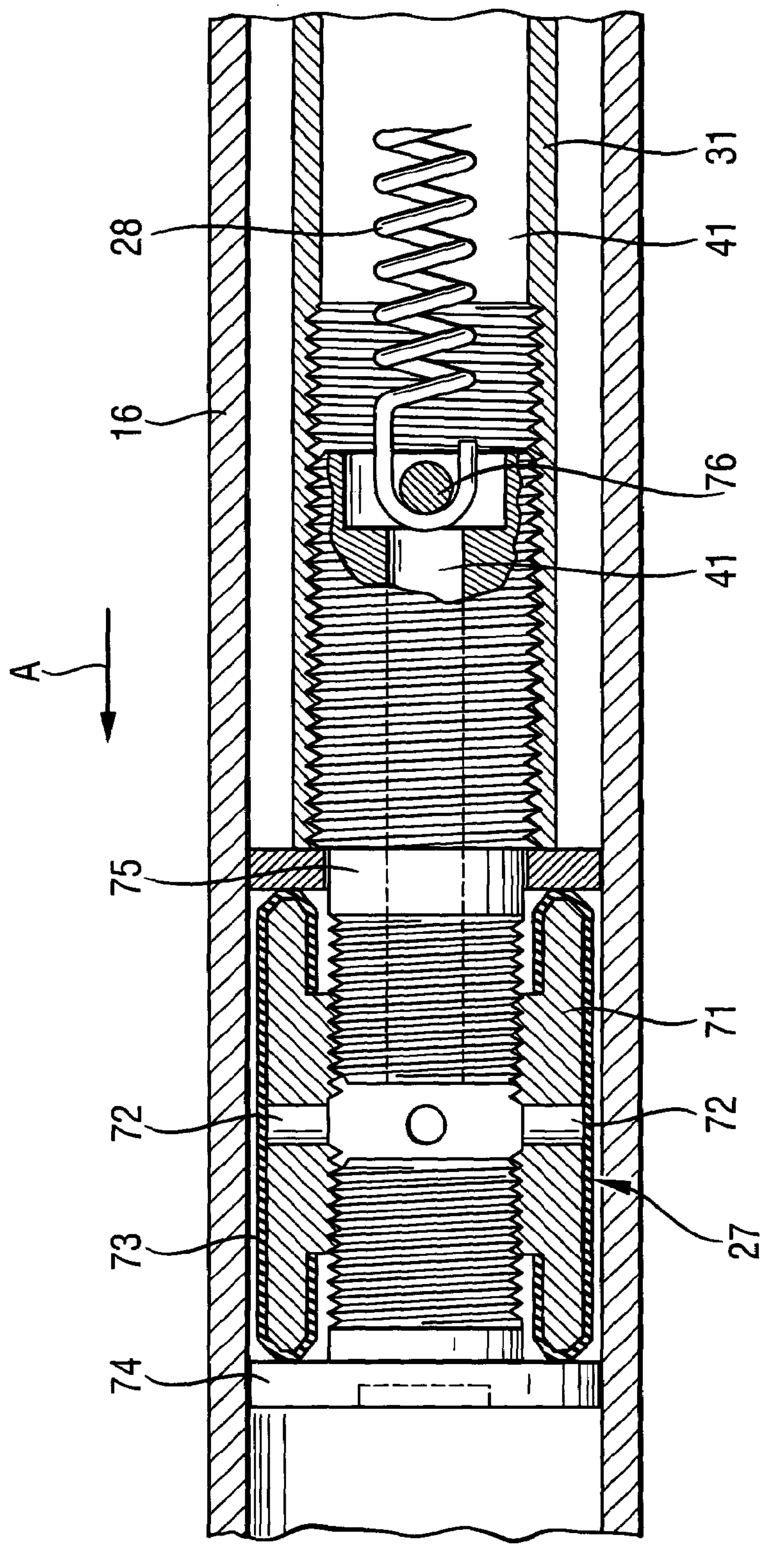
FIG. 6 a cross-sectional view, at an increased scale, of a carrier member.

FIG. 6 shows a detailed view of the carrier member 27. The carrier member 27, which is arranged in the first push member 16, includes a sleeve member 71 formed of metal and provided with two radial openings 72. Over the sleeve member 71, a rubber cover 73 is shrunk and which surround the free edges of the sleeve member 71. At the end of the sleeve member 71, which faces in the dispensing direction A, a cover 74 is sealingly screwed on. At the opposite end of the sleeve member 71, a connection member 75 is also sealingly screwed on. The connection member 75 connects the sleeve member 71 with the free end of tubular section 31 and forms simultaneously an attachment point 76 for the helical spring 28 that functions as a return device for the carrier member 27. Upon actuation of the actuation member 5 on the handle 2, compressed air flows into the carrier member 27 through the connection conduit 41 formed by the tubular section 31. The compressed air then flows through the openings 72 into the intermediate space between the sleeve member 71 and the cover 73 that expands radially, securing the carrier member 27 to the inner wall of the tubular push member 16. When the pressure in the compression chamber 52 is reduced because of opening of the relief valve 60, the compressed air flows from the intermediate space between the sleeve member 71 and the cover 73 through the openings 72 and the connection channel 41 back into the compression chamber 52. Thereby, the attachment between the carrier member 27 and the inner wall of the first push member 16 is eliminated, and the carrier member 27, together with the followup member 30 of the metering device 14 are pulled to their initial position by the spring 28.

In summary, it is shown that the dispenser according to the present invention insures dispensing of a dispensed mass with a very high precision at each dispensing process. In addition, the dispensing mechanism is very simple and reliable, which in particularly positively influences the performance capability of the dispenser. Because the metering device is arranged in the housing of the dispensing device except the adjusting means, there is no possibility for the mechanism of the metering device to be manipulated from outside, which advantageously influences the repeatability of the dispensing process. Moreover the inventive dispenser does not depend on other sources of energy, e.g., batteries, and it requires only a connection for feeding the driving pressure medium.

Though the present invention was shown and described with references to the preferred embodiment, such is merely illustrative of the present invention and are not to be construed as a limitation thereof and various modifications of the present invention will be apparent to those skilled in the art. It is therefor not intended that the present invention be limited to the disclosed embodiment or details thereof, and the present invention includes all variations and/or alternative embodiments within the spirit and scope of the present invention as defined by the appended claims.

What is claimed is:

1. A pressure medium-operated dispenser for dispensing a mass from a storage and dispensing container, comprising a housing (12); a dispensing device (13) supported in the housing (12) for displacement in a longitudinal direction (L) of the dispenser (11) and having a pressure medium-operated plunger (15), and at least one push member (16) connected with the plunger (15) and extending therefrom in a dispensing direction (A), the dispenser (11) having a compression chamber (52) for containing pressure medium for displacing the plunger (15); and a metering device (14) for presetting an amount of mass to-be-dispensed by the dispensing device (13) and including adjustment means (26) for setting the metered amount, a carrier member (27) cooperating with the dispensing device (13), a return element (28) for displacing the carrier member (27) from an end position thereof to an initial position thereof, a retaining member (29) supported in the housing (12) without possibility of displacement in the longitudinal direction (L) of the dispenser (11), and a follow-up member (30) displaceable in the longitudinal direction (L) of the dispenser (11) and extending in a guide tube connected with the plunger (15), the carrier member (27) being arranged at a free end of the follow-up member (30) and secured in the guide tube for connection the follow-up member (30) to the guide tube.

2. A dispenser according to claim 1, wherein the guide tube forms a component of the at least one push member (16).

3. A dispenser according to claim 1, wherein the carrier member (27) is radially expandable with the pressure medium.

4. A dispenser according to claim 3, wherein the carrier member (27) comprises a sleeve member (71) provided with at least one, radially extending opening (72), and an elastic, stretchable cover (73) surrounding the sleeve member (71).

5. A dispenser according to claim 4, wherein the follow-up member (30) is provided with a connection channel (41) for connecting the compression chamber (52) with the carrier member (27).

6. A dispenser according to claim 5, wherein the connection channel (41) extends through the retaining member (29).

7. A dispenser according to claim 6, further comprising a control valve (38) provided on the retaining member (29) for controlling flow of the pressure medium between the compression chamber (52) and the carrier member (27) to thereby control the expansion of the carrier member (27).

8. A dispenser according to claim 7, further comprising a control cam (37) provided on the housing (12) for controlling the control valve (38).

9. A dispenser according to claim 1, wherein the metering device (14) comprises a control cam (35) adjustable with the adjustment means (26).

10. A dispenser according to claim 9, wherein the follow-up member (30) has a sleeve (32) and a tubular section (31) fixedly connected with the sleeve (32), and wherein the control cam (35) is provided on the sleeve (32).

11. A dispenser according to claim 10, wherein the sleeve (32) has a stop for limiting maximal displacement of the dispensing device (13) in the longitudinal direction (L) of the dispenser (11).

12. A dispenser according to claim 9, further comprising a relief valve (60) provided on the housing (12) for venting the compression chamber (52), and a mechanism (57) for actuating the relief valve (60) and operable by the metering device (14).

13. A dispenser according to claim 12, wherein the actuating mechanism (57) is operated by the control cam (35).

14. A dispenser according to claim 13, wherein the helical spring is formed as a cylindrical helical spring.

15. A dispenser according to claim 1, wherein the return element (28) is formed as a helical spring.

16. A dispenser according to claim 1, comprising measurement means (23) provided on the housing (12) for indicating a displacement path covered by the at least one push member.

17. A dispenser according to claim 1, comprising measurement means (23) provided on the at least one push member (17) for indicating a displacement path covered thereby.

* * * * *